US012636738B2

(12) United States Patent
Yokoyama et al.

(10) Patent No.: US 12,636,738 B2
(45) Date of Patent: May 26, 2026

(54) SOLDER ALLOY, SOLDER PASTE, SOLDER BALL, RESIN FLUX-CORED SOLDER AND SOLDER JOINT

(71) Applicant: SENJU METAL INDUSTRY Co., Ltd., Tokyo (JP)

(72) Inventors: Takahiro Yokoyama, Saitama (JP); Kanta Dei, Tokyo (JP); Takahiro Matsufuji, Tokyo (JP); Hikaru Nomura, Tokyo (JP); Shunsaku Yoshikawa, Tokyo (JP)

(73) Assignee: SENJU METAL INDUSTRY Co., Ltd., Tokyo (JP)

( * ) Notice: Subject to any disclaimer, the term of this patent is extended or adjusted under 35 U.S.C. 154(b) by 67 days.

(21) Appl. No.: 16/967,717

(22) PCT Filed: Dec. 21, 2018

(86) PCT No.: PCT/JP2018/047180
§ 371 (c)(1),
(2) Date: Aug. 5, 2020

(87) PCT Pub. No.: WO2019/171710
PCT Pub. Date: Sep. 12, 2019

(65) Prior Publication Data
US 2021/0001431 A1    Jan. 7, 2021

(30) Foreign Application Priority Data

Mar. 8, 2018    (JP) ................................. 2018-042040
Jul. 24, 2018    (JP) ................................. 2018-138511

(51) Int. Cl.
B23K 35/26        (2006.01)
B23K 35/02        (2006.01)
(Continued)

(52) U.S. Cl.
CPC .......... B23K 35/262 (2013.01); B23K 35/025 (2013.01); C22C 13/02 (2013.01); B23K 2103/08 (2018.08)

(58) Field of Classification Search
None
See application file for complete search history.

(56) References Cited

U.S. PATENT DOCUMENTS 4,214,903 A * 7/1980 Murabayashi .......... C22C 12/00
420/577
5,368,814 A * 11/1994 Gonya ................. B23K 35/264
420/587
(Continued)

FOREIGN PATENT DOCUMENTS

CN        1494101 A        5/2004
CN    101051535 A        10/2007
(Continued)

OTHER PUBLICATIONS

Decision to Grant issued by the Japan Patent Office for corresponding Japanese Patent Application No. 2018-138511, mailed on Sep. 11, 2018, with a full English translation. Application No. 108100308, mailed on May 10, 2019 with an partial.
(Continued)

*Primary Examiner* — Devang R Patel
(74) *Attorney, Agent, or Firm* — Myers Wolin, LLC

(57)        ABSTRACT
A solder alloy includes an alloy composition consisting of 35 to 68 mass % of Bi, 0.5 to 3.0 mass % of In, 0.01 to 0.10 mass % of Pd, and a balance of Sn. A solder paste includes a solder alloy comprising an alloy composition consisting of 35 to 68 mass % of Bi, 0.5 to 3.0 mass % of In, 0.01 to 0.10 mass % of Pd, and a balance of Sn. A solder ball includes a solder alloy comprising an alloy composition consisting of
(Continued)

35 to 68 mass % of Bi, 0.5 to 3.0 mass % of In, 0.01 to 0.10 mass % of Pd, and a balance of Sn.

16 Claims, 1 Drawing Sheet

(51) Int. Cl.
*C22C 13/02* (2006.01)
*B23K 103/08* (2006.01)

(56) References Cited

U.S. PATENT DOCUMENTS

| | | | | |
|---|---|---|---|---|
| 5,755,896 A * | 5/1998 | Paruchuri | ............ | B23K 35/262 |
| | | | | 148/400 |
| 5,833,921 A * | 11/1998 | Paruchuri | ............ | B23K 35/264 |
| | | | | 420/577 |
| 6,184,475 B1 * | 2/2001 | Kitajima | .............. | B23K 35/025 |
| | | | | 174/257 |
| 7,042,327 B2 * | 5/2006 | Tanaka | .................... | C22C 12/00 |
| | | | | 337/160 |
| 7,282,174 B2 * | 10/2007 | Hirata | .................. | B23K 35/262 |
| | | | | 148/23 |
| 9,156,111 B2 * | 10/2015 | Hong | ................... | B23K 1/0016 |
| 9,162,324 B2 * | 10/2015 | Nakano | ................ | B23K 35/025 |
| 9,636,784 B2 * | 5/2017 | Zhang | .................... | C22C 30/02 |
| 9,801,285 B2 * | 10/2017 | Koep | ................... | B23K 35/262 |
| 2001/0001990 A1 | 5/2001 | Kitajima et al. | | |
| 2004/0085178 A1 | 5/2004 | Tanaka et al. | | |
| 2007/0178007 A1 | 8/2007 | Thantrong et al. | | |
| 2007/0235207 A1 | 10/2007 | Tsuji et al. | | |
| 2013/0153646 A1 | 6/2013 | Ho | | |
| 2015/0217410 A1 * | 8/2015 | Fujimaki | ................ | B23K 35/28 |
| | | | | 403/272 |

FOREIGN PATENT DOCUMENTS

| | | | |
|---|---|---|---|
| EP | 1416508 A1 | 5/2004 |
| JP | H7-1179 A | 1/1995 |
| JP | H8-150493 A | 6/1996 |
| JP | 2004-152558 A | 5/2004 |

OTHER PUBLICATIONS

Office Action for corresponding Taiwanese Patent English machine translation.

The extended European search report with supplementary European search report and the European search opinion Issued by the European Patent Office for corresponding European Patent application No. 18908704.2, mailed on Aug. 28, 2020.

Office Action and Examination Search Report issued by the Canadian Intellectual Property Office for corresponding Canadian Patent Application No. 3,093,091, dated Sep. 30, 2020.

Office Action issued by the State Intellectual Property Office of the P.R. China for corresponding Chinese Patent Application No. 201880088604.2, dated Nov. 27, 2020, with machine English translation.

Office Action issued by the Mexican Institute of industrial Property for corresponding Mexican Patent Application No. MX/a/2020/006919, dated Feb. 23, 2021, with an English translation.

Office Action issued by the State Intellectual Property Office of the P.R. China for corresponding Chinese Patent Application No. 1494101A, dated Nov. 27, 2020, with machine English translation.

Examiner Requisition issued by the Canadian Intellectual Property Office for corresponding Canadian Patent No. 3,093,091, dated Apr. 6, 2021.

Examination Report issued by the Patent Office of India for corresponding Indian Patent Application No. 202047026920, mailed on Mar. 25, 2021, with an English translation.

Substantive Examination Report issued by the Intellectual Property Office of the Philippines for corresponding Philippine Patent No. 1/2020/551403, mailed Mar. 22, 2022.

Hearing Notice issued by the Patent Office of India for corresponding Indian Patent Application No. 202047026920, dated Feb. 16, 2024, with an English translation.

* cited by examiner

SOLDER ALLOY, SOLDER PASTE, SOLDER BALL, RESIN FLUX-CORED SOLDER AND SOLDER JOINT

CROSS REFERENCE TO RELATED APPLICATIONS

This application is a national stage application of International Application PCT/JP2018/047180, filed on Dec. 21, 2018 and designated the U.S., which claims priority to Japanese Patent Application No. 2018-138511, filed on Jul. 24, 2018 and Japanese Patent Application No. 2018-042040, filed on Mar. 8, 2018. The contents of each are herein incorporated by reference.

FIELD

The present disclosure relates to a solder alloy having a low-melting point, a solder paste, a solder ball, a resin flux-cored solder and a solder joint.

BACKGROUND

In recent years, miniaturization of an electric device such as a CPU (Central Processing Unit) has been demanded. Since thermal loading at soldering increases as the electric device becomes smaller, it is desirable to carry out the soldering at a low temperature. If the soldering is carried out at the low temperature, it is possible to manufacture a highly reliable circuit board. In order to carry out the soldering at the low temperature, it is necessary to use a solder alloy having a low-melting point.

The low-melting point solder alloy includes Sn-58Bi and Sn-52In, as disclosed in JIS Z 3282 (2017). The melting points of these alloys are 139° C. and 119° C., respectively, and each of which has an alloy composition representing the low-melting point solder. In particular, Sn-58Bi is widely used as the solder alloy which is low-cost and has excellent wettability.

However, in the Sn—Bi solder alloy where large Bi is contained, Bi segregates in Sn during solidification and a coarse Bi phase is precipitated. Since the Bi phase exhibits a hard and brittle nature, it deteriorates mechanical properties of the solder alloy. Therefore, various solder alloys have been studied in order to improve the mechanical properties while suppressing an increase of the melting point.

For example, Patent Literature 1 discloses a solder alloy which contains the Sn—Bi solder alloy and, as a third ingredient, about 2 wt % of at least one element selected from a group consisting of In, Cu and Ag, a combination of Cu and Ag, and composites thereof, in order to enhance physical-mechanical characteristic of an effective amount. Patent Literature 2 discloses a solder alloy which contains the Sn—Bi solder alloy and 0.5% or more and less than 50% In, in order to tensile strength and elongation exhibit values equal to or more than predetermined values.

CITATION LIST

Patent Literature

[PTL 1] JPH7-001179A
[PTL 2] JPH8-150493A

SUMMARY

Technical Problem

Patent Literatures 1 and 2 disclose that the mechanical properties of the low-melting point solder alloy are improved by the addition of In. It is estimated that the inventions disclosed in these literatures were made on the basis that In is a solid solution strengthening element of Sn. However, one of the reasons why the mechanical properties of the Sn—Bi solder alloy deteriorate includes an existence of the coarse Bi phase which is a hard and brittle phase. Therefore, even if a Sn phase is solidified and strengthened by In, when stresses are applied to the solder alloy, the solder alloy breaks from the Bi phase as a starting point. Further, in recent years, use of substrates has been diversified, and it is desired to form a solder joint which is able to cope with an application to which an impact is applied. However, there is a possibility that the substrates may be broken by the impact such as dropping due to the existence of the coarse Bi phase. On the other hand, if content of Bi is reduced in order to suppress generation of the Bi phase, the melting point increases, and there is a possibility that the solder alloy is not sufficiently melted by a conventional reflow temperature and a fusion failure occurs. If the reflow temperature is increased in order to melt the solder alloy having a high-melting point, a warpage occurs in substrates or packages during heating, and the solder alloy and the electrode are separated from each other. In this instance, since the solidification of the solder alloy is faster than relaxation of the warpage in the substrates or the packages during cooling, the solder alloy solidifies while the solder alloy and the electrode are separated from each other, and the fusion failure may occur.

In addition, FIG. 1 and FIG. 2 of Patent Literature 2 show results in which the tensile strength decreases and ductility increases as the content of In increases. Therefore, it is understood that Patent Literatures 1 and 2 indicate the ductility among the mechanical properties is improved by the addition of In, whereas the tensile strength is not so much improved but reduced. In addition, depending on the content of In, since deformity of the solder alloy may cause after heat cycling, heat-cycle resistance may decrease.

As described above, in the conventional solder alloys, it is difficult to suppress the occurrence of the fusion failure by the low-melting point while improving all of the mechanical properties and the heat-cycle resistance at the same time. In order to suppress the deterioration of the reliability of the electronic circuit due to the miniaturization of the electric device, all of these characteristics need to be excellent.

It is an object of the present disclosure to provide a solder alloy, a solder paste, a solder ball, a resin flux-cored solder and a solder joint, both of which has the low-melting point to suppress the occurrence of the fusion failure and has excellent mechanical properties, impact resistance and excellent heat-cycle resistance.

Solution to Problem

First, in order to improve the mechanical properties of the Sn—Bi solder alloy having the low-melting point, the inventors examined while focusing on making alloy organization of the solder alloy fine. As a result, by adding a predetermined amount of In, which is known as the solid solution strengthening element of Sn, it was fortuitously confirmed that the alloy organization becomes fine to some extent, and the ductility is highly improved. It was also confirmed that the tensile strength of the solder alloy is equivalent to that of the Sn—Bi solder alloy. However, in view of the fact that the alloy organization becomes coarse after the heat cycles and the heat-cycle resistance is lowered, it is thought that the alloy organization needs to be made finer. Here, it is estimated that the alloy organization becomes finer when the content of In is further increased. However, when a large amount of In is added, it promotes generation of a low-melting point phase and there is a fear that the heat-cycle resistance is deteriorated.

The inventors conducted a further detailed examination in order to improve the heat-cycle resistance due to the miniaturization of the alloy organization. Since noble metals are generally costly and are known to form coarse compounds with Sn, it has heretofore been avoided that noble metals are contained in Sn-based solder alloy in certain amounts. However, by interposing Pd in its intermediate layer, a Ni/Pd/Au metal plating exhibits high mounting reliability to prevent Cu from diffusing into a solder. That is, in the case of the above metal plating, it is estimated that undue diffusion of Cu is suppressed by the inclusion of Pd. For this reason, it was estimated that grain growth can be suppressed even after thermal history such as the heat cycling particularly after mounting and the higher heat-cycle resistance can be exhibited.

Therefore, when Pd being a noble metal was intentionally added after adding a predetermined amount of In which dissolves in Sn and Bi, it was fortuitously found that the structure of the solder alloy becomes fine. In particular, it was found that the Bi phase, which is the brittle phase, became finer and exhibited excellent tensile strength and ductility, and excellent impact resistance.

Furthermore, when the Sn—Bi solder alloy contains a predetermined amount of both elements of In and Pd, it was found that the increase in the melting point falls within an allowable range and the generation of the fusion failure is suppressed.

In addition, when the Sn—Bi solder alloy contains both elements of In and Pd, since the alloy organization becomes fine, it was found that coarsening of the alloy organization is suppressed in environments where temperature changes for a long time such as the heat cycle and thus excellent heat-cycle resistance is obtained.

The present disclosures obtained by these findings are as follows.

(1) A solder alloy characterized in that comprising an alloy composition consisting of 35 to 68 mass % of Bi, 0.5 to 3.0 mass % of In, 0.01 to 0.10 mass % of Pd, and a balance of Sn.

(2) The solder alloy according to (1), wherein the alloy composition contains 1.0 to 2.0 mass % of In.

(3) The solder alloy according to (1) or (2), wherein the alloy composition contains 0.01 to 0.03 mass % of Pd.

(4) The solder alloy according to any one of (1) to (3), wherein the alloy composition further contains at least one of Co, Ti, Al and Mn in total amount of 0.1 mass % or less.

(5) The solder alloy according to any one of (1) to (4), wherein the alloy composition further contains at least one of P, Ge, and Ga in total amount of 0.1 mass % or less.

(6) A solder paste comprising the solder alloy according to any one of (1) to (5).

(7) A solder ball comprising the solder alloy according to any one of (1) to (5).

(8) A resin flux-cored solder comprising the solder alloy according to any one of (1) to (5).

(9) A solder joint comprising the solder alloy according to any one of (1) to (5).

BRIEF DESCRIPTION OF DRAWINGS

FIG. 1(*a*) is a cross-section SEM photography of the solder alloy of Comparative Example 1; FIG. 1(*b*) is the cross-section SEM photography of the solder alloy of Comparative Example 2; and FIG. 1(*c*) is the cross-section SEM photography of the solder alloy of Example 2.

DESCRIPTION of EMBODIMENTS

Figure 1A:
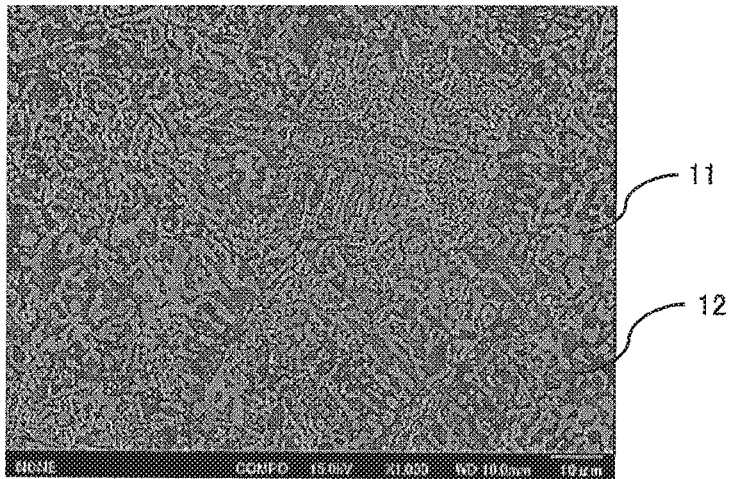
FIG. 1 is SEM photographs of solder alloys.

The present disclosure is described in more detail below. In this description, "%" with respect to a solder alloy composition is "mass %" unless otherwise specified.
1. Alloy Composition of Solder Alloy
(1) Bi: 35 to 68%

Bi is an element required to suppress generation of the fusion failure by lowering the melting point of the solder alloy and to exhibit excellent heat-cycle resistance. Since the melting point of a Sn—Bi eutectic alloy is as low as 139° C., Bi is able to lower the melting point of the solder alloy and suppress the fusion failure. In addition, it is known that the solder alloy containing a predetermined amount of Bi exhibits superplasticity, and exhibits excellent ductility. Therefore, the solder alloy containing the predetermined amount of Bi is excellent in the ductility and the heat-cycle resistance.

If the content of Bi is less than 35%, the fusion failure may occur due to an increase in the melting point, and the tensile strength and the heat-cycle resistance may deteriorate. The lower limit of the content of Bi is 35% or more, preferably 45% or more, more preferably 50% or more, and still more preferably 54% or more. On the other hand, if the content of Bi exceeds 68%, the fusion failure may occur due to the increase in the melting point. Further, due to a precipitation of a large amount of the hard, brittle and coarse Bi phase, the solder alloy itself becomes hard and the ductility deteriorates. An upper limit of the content of Bi is 68% or less, preferably 65% or less, more preferably 63% or less, and still more preferably 58% or less.
(2) In: 0.5 to 3.0%

In is an element required for lowering the melting point of the solder alloy, making the alloy organization fine, and improving excellent ductility, impact resistance and heat-cycle resistance. In is the solid solution strengthening element, and since In is dissolvable in Sn and Bi to form crystal core, the alloy organization becomes uniform and fine and the ductility is improved. In addition, the solder alloy containing a predetermined amount of In is excellent in the heat-cycle resistance. When the content of In is within the range mentioned above, phase transformation between βSn and γSn is suppressed during the heat cycling and a higher heat-cycle resistance can be obtained.

If the content of In is less than 0.5%, the effects mentioned above cannot be exhibited. In addition, the fusion failure may occur due to the increase in the melting point. The lower limit of the content of In is 0.5% or more, preferably 0.7% or more, more preferably 1.0% or more. On the other hand, when the content of In exceeds 3.0%, since a large amount of the intermetallic compound is precipitated, the tensile strength deteriorates. Further, since βSn is transformed into γSn during a heat cycle test, volume of the solder alloy is changed and the heat-cycle resistance deteriorates. The upper limit of the content of In is 3.0% or less, preferably 2.5% or less, more preferably 2.2% or less, and particularly preferably 2.0% or less.
(3) Pd: 0.01 to 0.10%

Pd is an element required to improve the tensile strength while maintaining the ductility of the solder alloy. If the content of Pd is within a predetermined range in a Sn—Bi—In—Pd solder alloy where the contents of Bi and In are within the ranges mentioned above, it is possible to suppress that the solder alloy becomes a compound containing coarse Sn and Pd. Detailed reasons of this are unknown, but are guessed as follows.

Because of dragging effect in which diffusion speed of Sn becomes slow due to solid solution of In to Sn and Bi, formation of the compound containing coarse Sn and Pd is suppressed. Therefore, when Pd is contained in the predetermined amount in Sn—Bi—In—Pd solder alloy where the contents of Bi and In are within the ranges mentioned above, it is possible to suppress the precipitation of the compound containing coarse Sn and Pd, and thus the alloy organization becomes fine. In detail, the Bi phase being a brittle phase becomes finer than a Sn phase being a stress-relaxation phase, and a particularly excellent ductility is exhibited. Such the fine alloy organization is obtained only in a alloy composition in which Sn contains Bi and In at the same time and also contains Pd. Further, in the alloy composition containing Pd, since a large number of solidified core of Pd are generated, growing of the Sn phase precipitated around each of the cores is suppressed, and the entire structure becomes fine. As a result, the mechanical strength and the impact resistance are improved by the precipitation of a compound containing fine Sn and Pd.

If the content of Pd is less than 0.01%, the effects mentioned above cannot be exhibited. The lower limit of the content of Pd is 0.01% or more. On the other hand, if the content of Pd exceeds 0.10%, the compound containing coarse Sn and Pd precipitates. In addition, the fusion failure may occur due to the increase in the melting point. The upper limit of the content of Pd is 0.10% or less, preferably 0.08% or less, more preferably 0.05% or less, and particularly preferably 0.03% or less.

(5) 0.1% or Less of at Least One of Co, Ti, Al and/or Mn in Total

These elements are optional elements which may be contained as long as they do not hinder the effects mentioned above. From a viewpoint of maintaining the mechanical properties, the impact resistance and the heat-cycle resistance while suppressing the formation of compounds and also keeping the miniaturization of the alloy organization, the content of these elements is preferably 0.1% or less.

(6) 0.1 Mass % or Less of at Least One of P, Ge and Ga

These elements are optional elements capable of suppressing oxidation of Sn and improving the wettability. If the content of these elements does not exceed 0.1%, the fluidity of the solder alloy on a solder surface is not impaired. The total of the content of these elements is more preferably 0.003 to 0.01%. Although the content of each element is not particularly limited, the content of P is preferably 0.002 to 0.005%, the content of Ge is preferably 0.002 to 0.006%, and the content of Ga is preferably 0.002 to 0.02% in order to sufficiently express the effects mentioned above.

(7) Balance: Sn

A balance of the solder alloy according to the present disclosure is Sn. In addition to the elements mentioned above, an unavoidable impurity may be contained. Even when the unavoidable impurity is contained, the effects mentioned above are not affected. As will be described later, even if an element which is not contained in the present disclosure is contained as the unavoidable impurity, the effects mentioned above are not affected.

(8) Zr, Ni, Al and Ag, Fe, Ca, Pt, Mg and Sb

It is desirable that the solder alloy according to the present disclosure does not contain these elements. Simultaneous addition of Al and Ag, Zr or Ni forms coarse compounds which prevent the formation of a uniform and fine alloy organization. Fe, Ca, Pt or Mg promotes the coarsening of the alloy organization. When Sb is combined with In, the ductility is remarkably lowered. Note that when these elements are contained as the unavoidable impurities, the effects mentioned above are not affected.

2. Solder Paste

The solder alloy according to the present disclosure may be used as a solder paste. The solder paste is a pasty form of solder alloy powder mixed with a small amount of fluxes. The solder alloy according to the present disclosure may be used as a solder paste for mounting an electronic component on a printed circuit board by a reflow soldering method. The flux used in the solder paste may be either a water-soluble flux or anon-water-soluble flux. Typically, a rosin-based flux is used which is a rosin-based, water insoluble flux.

The solder paste according to the present disclosure may be applied to an electrode on a board side to be used for bonding to a Sn—Ag—Cu solder ball on a BGA side.

3. Solder Ball

The solder alloy according to the present disclosure may be used as a solder ball. The solder ball according to the present disclosure is used for forming a bump on the electrode of a semiconductor package such as BGA (Ball Grid Arrays), or substrates. The diameter of the solder ball according to the present disclosure is preferably 1 to 1000 μm. The solder ball can be manufactured by a common solder ball manufacturing method.

4. Resin Flux-Cored Solder

The solder alloy according to the present disclosure is suitably used in a resin flux-cored solder where flux is previously contained in the solder. It may also be used in a form of wire solder from the viewpoint of supplying the solder to a soldering iron. Furthermore, it may be applied to an incoming wire solder in which the flux is sealed to the wire solder. The surface of each solder may be coated with the flux. In addition, the flux may be coated on the surface of the solder in which the flux is not contained.

The content of the flux in the solder is, for example, 1 to 10 mass %, and the content of the rosin in the flux is 70 to 95%. Generally, the rosin is an organic compound and contains carbon and oxygen, and therefore, the rosin used in the present disclosure is not limited by a terminal functional group or the like.

5. Solder Joint

A solder joint according to the present disclosure connects an IC chip and a substrate (an interposer) in a semiconductor package, or connects the semiconductor package and a printed circuit board. That is, the solder joint according to the present disclosure is referred to as a connecting portion of the electrode, and is able to form by using a common soldering condition.

5. Other

In addition to the above, the solder alloy according to the present disclosure may be used as a preform solder, a solder wire and the like.

A manufacturing method of the solder alloy according to the present disclosure may be carried out in accordance with a conventional method. A bonding method using the solder alloy according to the present disclosure may be carried out in accordance with a method by using a reflow method, for example. When the flow soldering is carried out, the melting point of the solder alloy may be approximately 20° C. higher than a liquidus temperature. Further, when bonding is carried out by the solder alloy according to the present disclosure, the alloy organization may be finer by considering cooling speed during the solidification. For example, the solder joint is cooled at the cooling speed of 2 to 3° C./s or more. The other bonding conditions may be appropriately adjusted in accordance with the alloy composition of the solder alloy.

The solder alloy according to the present disclosure can produce a low α-ray alloy by using a low α-ray material as its raw material. Such the low α-ray alloy can suppress soft errors when used to form solder bumps around memories.

EXAMPLES

Solder alloys were prepared, each of which consists of alloy composition shown in Table 1, to observe alloy organization and measure the melting point (liquidus temperature), and to evaluate the tensile strength, the ductility, the impact resistance and the heat-cycle resistance.

Observing Alloy Organization

Each solder alloy consisting of each alloy composition shown in Table 1 was cast into a predetermined mold, and the obtained solder alloy was molded with a resin and polished, and a portion where the solder alloy was polished by about half was photographed with a FE-SEM at 1000-fold magnification.

Liquidus Temperature

Each solder alloy shown in Table 1 was prepared and the liquidus temperature of the solder alloys were measured. The liquidus temperature was measured by a DSC-based method similar to the DSC-based method for measuring the solidus temperature shown in JIS Z 3198-1. When the liquidus temperature was 170° C. or less, it was evaluated as "T", and when it exceeded 170° C., it was evaluated as "F".

Tensile Strength and Ductility

The tensile strength was measured according to JISZ3198-2. For each solder alloy listed in Table 1, a test piece having a gauge length of 30 mm and a diameter of 8 mm was produced by casting into a mold. The produced test piece was pulled at a stroke of 6 mm/min at room temperature by a Type5966 manufactured by Instron Corporation, and the tensile strength was measured. Using the same test piece, the test piece was pulled at a stroke of 0.6 mm/min at room temperature by the Type5966 manufactured by Instron Corporation, and the elongation (the ductility) when the test piece was broken was measured. In the present example, when the tensile strength was 70 MPa or more, it was evaluated as "T", and when the tensile strength was less than 70 MPa, it was evaluated as "F". When the elongation (the ductility) was 120% or more, it was judged to be practically satisfactory and evaluated as "T". When the elongation was less than 120%, it was evaluated as "F".

Impact Resistance

Each solder alloy listed in Table 1 was atomized to be a solder powder. A solder paste of the respective solder alloy was prepared by mixing with the soldering flux made of the pine resin, the solvent, the activator, the thixotropic agent, the organic acid or the like. The solder paste was printed on the printed circuit board (material: FR-4) having the thickness of 0.8 mm with the metal mask having the thickness of 120 μm, and 10 BGA components were mounted with the mounter, and reflow soldering was performed at the maximum temperature of 190° C. and the holding time of 60 seconds to produce the test substrate.

Next, both ends of the test substrate were fixed to a pedestal with bolts so that the BGA component faces the pedestal. In this condition, an impact of 1500G was applied in accordance with the JEDEC standard to evaluate the impact resistance. Thereafter, a resistance value was measured. When the resistance value was less than 1.5 times from an initial resistance value, it was evaluated as "T", and when the resistance value was 1.5 times or more, it was evaluated as "F".

Heat-Cycle Resistance

Each solder alloy listed in Table 1 was atomized to be a solder powder. A solder paste of the respective solder alloy was prepared by mixing with a soldering flux made of a pine resin, a solvent, an activator, a thixotropic agent, an organic acid or the like. The solder paste was printed on a printed circuit board (material: FR-4) having a thickness of 0.8 mm with a metal mask having a thickness of 100 μm, and 15 BGA components were mounted with a mounter, and reflow soldering was performed at a maximum temperature of 190° C. and a holding time of 60 seconds to produce a test substrate.

The test substrates soldering with the respective solder alloy were placed in a heat-cycle test device set to a condition of low temperature −40° C., high temperature +100° C., and the holding time of 10 minutes, and number of cycles at which the resistance value of at least one BGA component exceeded 155 was determined from an initial resistance value of 3 to 5. When the cycles were 1700 or more, it was evaluated as "T" and when the cycles were less than 1700, it was evaluated as "F".

The evaluation results are shown in Table 1.

TABLE 1

| | | | | | ALLOY COMPOSITION (mass %) | | | | | | | | |
| | | | Sn | Bi | In | Pd | Co | Ti | Al | Mn | P | Ge | Ga | Sb |
|---|---|---|---|---|---|---|---|---|---|---|---|---|---|---|
| EXAM-PLES | 1 | | BAL | 35 | 2.0 | 0.03 | — | — | — | — | — | — | — | — |
| | 2 | | BAL | 58 | 2.0 | 0.03 | — | — | — | — | — | — | — | — |
| | 3 | | BAL | 65 | 2.0 | 0.03 | — | — | — | — | — | — | — | — |
| | 4 | | BAL | 58 | 1.0 | 0.03 | — | — | — | — | — | — | — | — |
| | 5 | | BAL | 40 | 1.0 | 0.04 | — | — | — | — | — | — | — | — |
| | 6 | | BAL | 65 | 1.0 | 0.05 | — | — | — | — | — | — | — | — |
| | 7 | | BAL | 58 | 3.0 | 0.03 | — | — | — | — | — | — | — | — |
| | 8 | | BAL | 58 | 3.0 | 0.08 | — | — | — | — | — | — | — | — |
| | 9 | | BAL | 58 | 2.0 | 0.1 | — | — | — | — | — | — | — | — |
| | 10 | | BAL | 58 | 2.0 | 0.01 | — | — | — | — | — | — | — | — |
| | 11 | | BAL | 58 | 2.0 | 0.03 | 0.1 | — | — | — | — | — | — | — |
| | 12 | | BAL | 58 | 2.0 | 0.03 | — | 0.1 | — | — | — | — | — | — |
| | 13 | | BAL | 58 | 2.0 | 0.03 | — | — | 0.1 | — | — | — | — | — |
| | 14 | | BAL | 58 | 2.0 | 0.03 | — | — | — | 0.1 | — | — | — | — |
| | 15 | | BAL | 58 | 2.0 | 0.03 | — | — | — | — | 0.003 | — | — | — |
| | 16 | | BAL | 58 | 2.0 | 0.03 | — | — | — | — | 0.05 | — | — | — |
| | 17 | | BAL | 58 | 2.0 | 0.03 | — | — | — | — | — | 0.1 | — | — |
| | 18 | | BAL | 58 | 2.0 | 0.03 | — | — | — | — | — | 0.01 | — | — |

TABLE 1-continued

|  |  |  |  |  |  |  |  |  |  |  |  |  |  |
|---|---|---|---|---|---|---|---|---|---|---|---|---|---|
|  | 19 | BAL | 58 | 2.0 | 0.03 | — | — | — | — | — | 0.005 | — | — |
|  | 20 | BAL | 58 | 2.0 | 0.03 | — | — | — | — | — | — | 0.1 | — |
|  | 21 | BAL | 58 | 2.0 | 0.03 | — | — | — | — | — | — | 0.005 | — |
|  | 22 | BAL | 58 | 2.0 | 0.03 | — | — | — | — | — | — | 0.01 | — |
| COMPA-RATIVE EXAM-PLES | 1 | BAL | 58 | = | = | — | — | — | — | — | — | — | — |
|  | 2 | BAL | 58 | = | 0.03 | — | — | — | — | — | — | — | — |
|  | 3 | BAL | 58 | 2.0 | — | — | — | — | — | — | — | — | — |
|  | 4 | BAL | 30 | 2.0 | 0.03 | — | — | — | — | — | — | — | — |
|  | 5 | BAL | 75 | 2.0 | 0.03 | — | — | — | — | — | — | — | — |
|  | 6 | BAL | 58 | 0.4 | 0.03 | — | — | — | — | — | — | — | — |
|  | 7 | BAL | 58 | 4.0 | 0.03 | — | — | — | — | — | — | — | — |
|  | 8 | BAL | 58 | 2.0 | 0.2 | — | — | — | — | — | — | — | — |
|  | 9 | BAL | 58 | 2.0 | 0.03 | — | — | — | — | — | — | — | 0.5 |
|  | 10 | BAL | 58 | 2.0 | 0.03 | — | — | — | — | — | — | — | — |
|  | 11 | BAL | 58 | 2.0 | 0.03 | — | — | — | — | — | — | — | — |
|  | 12 | BAL | 58 | 2.0 | 0.03 | — | — | — | — | — | — | — | — |
|  | 13 | BAL | 58 | 2.0 | 0.03 | — | — | — | — | — | — | — | — |
|  | 14 | BAL | 58 | 2.0 | 0.03 | — | — | — | — | — | — | — | — |
|  | 15 | BAL | 58 | 2.0 | 0.03 | — | — | — | — | — | — | — | — |
|  | 16 | BAL | 58 | 2.0 | 0.01 | — | — | — | — | — | — | — | — |

|  |  | ALLOY COMPOSITION (mass %) |  |  |  |  |  |  | LIQUIDS TEMPER-ATURE | TS | DUC-TILITY | IM-PACT RESIST-ANCE | HEAT CYCLE RESIST-ANCE |
|---|---|---|---|---|---|---|---|---|---|---|---|---|---|
|  |  | Zr | Ni | Al+Ag | Fe | Ca | Pt | Mg |  |  |  |  |  |
| EXAM-PLES | 1 | — | — | — | — | — | — | — | T | T | T | T | T |
|  | 2 | — | — | — | — | — | — | — | T | T | T | T | T |
|  | 3 | — | — | — | — | — | — | — | T | T | T | T | T |
|  | 4 | — | — | — | — | — | — | — | T | T | T | T | T |
|  | 5 | — | — | — | — | — | — | — | T | T | T | T | T |
|  | 6 | — | — | — | — | — | — | — | T | T | T | T | T |
|  | 7 | — | — | — | — | — | — | — | T | T | T | T | T |
|  | 8 | — | — | — | — | — | — | — | T | T | T | T | T |
|  | 9 | — | — | — | — | — | — | — | T | T | T | T | T |
|  | 10 | — | — | — | — | — | — | — | T | T | T | T | T |
|  | 11 | — | — | — | — | — | — | — | T | T | T | T | T |
|  | 12 | — | — | — | — | — | — | — | T | T | T | T | T |
|  | 13 | — | — | — | — | — | — | — | T | T | T | T | T |
|  | 14 | — | — | — | — | — | — | — | T | T | T | T | T |
|  | 15 | — | — | — | — | — | — | — | T | T | T | T | T |
|  | 16 | — | — | — | — | — | — | — | T | T | T | T | T |
|  | 17 | — | — | — | — | — | — | — | T | T | T | T | T |
|  | 18 | — | — | — | — | — | — | — | T | T | T | T | T |
|  | 19 | — | — | — | — | — | — | — | T | T | T | T | T |
|  | 20 | — | — | — | — | — | — | — | T | T | T | T | T |
|  | 21 | — | — | — | — | — | — | — | T | T | T | T | T |
|  | 22 | — | — | — | — | — | — | — | T | T | T | T | T |
| COMPA-RATIVE EXAM-PLES | 1 | — | — | — | — | — | — | — | T | F | F | F | F |
|  | 2 |  |  |  |  |  |  |  | T | T | F | — | — |
|  | 3 | — | — | — | — | — | — | — | T | F | T | F | T |
|  | 4 | — | — | — | — | — | — | — | F | F | T | — | — |
|  | 5 | — | — | — | — | — | — | — | F | T | F | — | — |
|  | 6 | — | — | — | — | — | — | — | F | T | F | — | — |
|  | 7 | — | — | — | — | — | — | — | T | F | T | — | — |
|  | 8 | — | — | — | — | — | — | — | F | T | F | — | — |
|  | 9 | — | — | — | — | — | — | — | T | T | F | — | — |
|  | 10 | 0.1 | — | — | — | — | — | — | T | F | F | — | — |
|  | 11 | — | 0.1 | — | — | — | — | — | T | F | F | — | — |
|  | 12 | — | — | 0.1 | — | — | — | — | T | F | F | — | — |
|  | 13 | — | — | — | 0.1 | — | — | — | T | F | F | — | — |
|  | 14 | — | — | — | — | 0.1 | — | — | T | F | F | — | — |
|  | 15 | — | — | — | — | — | 0.1 | — | T | F | F | — | — |
|  | 16 | — | — | — | — | — | — | 0.1 | T | F | F | — | — |

UNDERLINE MEANS THAT VALUE IS OUTSIDE SCOPE OF PRESENT INVENTION

As shown in Table 1, Examples 1 to 22 were found to be superior in the tensile strength, the ductility, and the impact resistance. Further, it was found that the generation of the fusion failure was suppressed because the liquidus temperature was low, and the coarsening of the alloy organization was suppressed even after the heat cycling because the alloy organization was fine, and thus the heat-cycle resistance was excellent.

On the other hand, since Comparative Example 1 did not contain In and Pd, the alloy organization did not become fine and was inferior in the tensile strength, the ductility, the impact resistance and the heat-cycle resistance. The mechanical strength of Comparative Example 2 was improved over that of Comparative Example 1 by the precipitation of a compound of Sn and Pd because it contained Pd, but the ductility was inferior because it did not contain In. Since the ductility of Comparative Example 2 was inferior, the heat-cycle resistance or the impact resistance were not evaluated. Comparative Example 3 was inferior in the tensile strength and the impact resistance because it did not contain Pd.

The liquidus temperature of Comparative Example 4 exceeded 170° C. because it contained a small amount of Bi. The liquidus temperature of Comparative Example 5 exceeded 170° C. because it contained a large amount of Bi. The liquidus temperature of Comparative Example 6 exceeded 170° C. because it contained a small amount of In. The tensile strength of Comparative Example 7 decreased because it contained a large amount of In. The liquidus temperature of Comparative Example 8 exceeded 170° C. and the ductility was inferior because it contained a large amount of Pd. These examples were not evaluated for the heat-cycle resistance and the impact resistance because at least one of the liquidus temperature, the tensile strength and the ductility was inferior.

The Comparative Example 9 was inferior in the ductility because In and Sb coexisted. Therefore, the heat-cycle resistance and the impact resistance were not evaluated.

The Comparative Examples 10 to 16 were inferior in the ductility and the like because the alloy organization became coarse. Therefore, the heat-cycle resistance and the impact resistance were not evaluated.

Figure 1B:
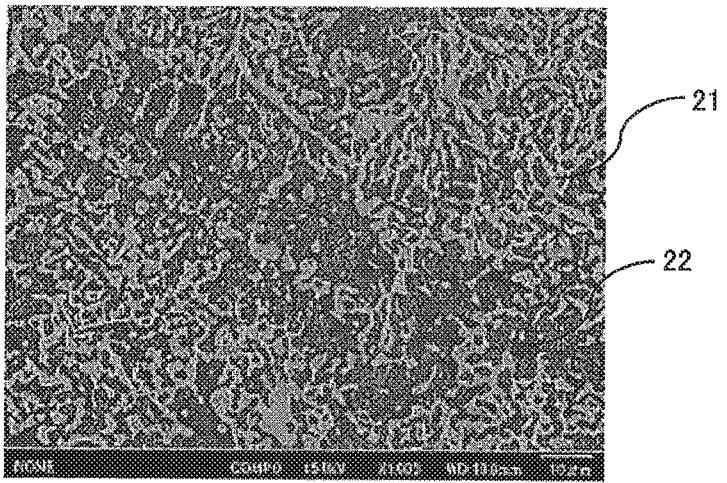
Figure 1C:
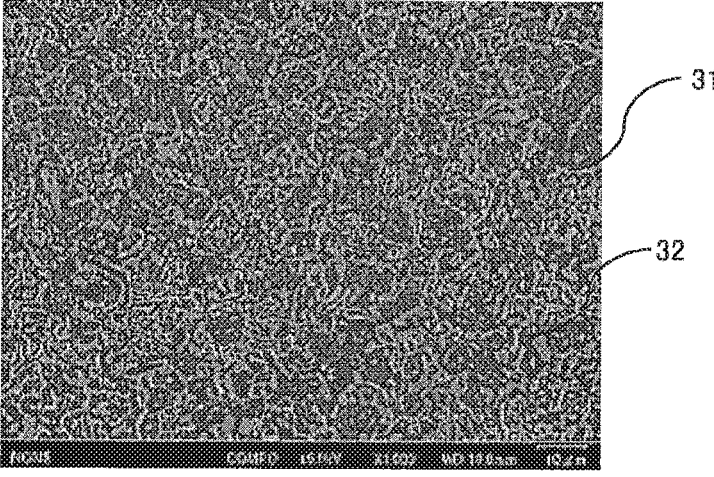

Observations of the alloy organization of Comparative Examples 1 and 2 and Example 2 shown in Table 1 are shown. FIG. 1 is SEM photographs of solder alloys: FIG. 1(a) is a cross-section SEM photography of the solder alloy of Comparative Example 1; FIG. 1(b) is the cross-section SEM photography of the solder alloy of Comparative Example 2; and FIG. 1(c) is the SEM photography of the solder alloy of Example 2. In FIGS. 1(a) to 1(c), white portions correspond to the Bi phase and gray portions correspond to the β-Sn phase.

It was found from FIG. 1(a) that the coarse Bi phase exists because In and Pd are not contained in Comparative Example 1. It was found from FIG. 1(b) that the alloy organization of Comparative Example 2 was fine in comparison to FIG. 1 (a) because it contained In, whereas it was not sufficiently fine to obtain desired characteristics. It was found from FIG. 1(c) from Example 2 that the alloy organization of Example 2 was finest because it contained In and Pd. In particular, it was found that miniaturization of the Bi phase being the brittle phase was remarkable. In each of the other Examples, it was observed that the alloy organization was as fine as shown in FIG. 1(c).

As mentioned above, the Sn—Bi—In—Pd solder alloy exhibits excellent tensile strength, ductility, and impact resistance, and heat-cycle resistance because of its fine organization.

REFERENCE SIGNS LIST

11, 21, 31 Bi phase
12, 22, 32 Sn phase
The invention claimed is:

1. A solder alloy consisting of 54 to 68 mass % of Bi, 1.2 to 3.0 mass % of In, 0.01 to 0.10 mass % of Pd, optionally at least one of Co, Ti, Al and Mn in total amount of 0.1 mass % or less, optionally at least one of P, Ge, and Ga in total amount of 0.1 mass % or less, and a balance of Sn, wherein a Bi phase in the solder alloy is finer than a Sn phase in the solder alloy such that the solder alloy leads to excellent ductility and heat-cycle resistance compared to a solder alloy lacking In and Pd.

2. The solder alloy according to claim 1, wherein the content of In is 1.5 to 2.9 mass %.

3. The solder alloy according to claim 1, wherein the content of Pd is 0.01 to 0.03 mass %.

4. The solder alloy according to claim 1, wherein a liquidus temperature of the solder alloy is equal to or lower than 170 degrees C.

5. A solder paste comprising the solder alloy according to claim 1.

6. A solder ball comprising the solder alloy according to claim 1.

7. A resin flux-cored solder comprising the solder alloy according to claim 1.

8. A solder joint comprising the solder alloy according to claim 1.

9. The solder alloy according to claim 1, wherein the content of Bi is 54 to 65 mass %.

10. The solder alloy according to claim 9, wherein the content of Bi is 54 to 63 mass %.

11. The solder alloy according to claim 1, wherein the content of In is 1.5 to 2.5 mass %.

12. The solder alloy according to claim 1, wherein the content of In is 1.5 to 2.2 mass %.

13. The solder alloy according to claim 1, wherein the content of In is 1.5 to 2.0 mass %.

14. The solder alloy according to claim 1, wherein the content of In is 1.8 to 2.9 mass %.

15. The solder alloy according to claim 1, wherein the content of In is 1.8 to 2.5 mass %.

16. The solder alloy according to claim 1, wherein the content of In is 1.8 to 2.2 mass %.

* * * * *